United States Patent
Morgner et al.

(10) Patent No.: US 10,956,618 B2
(45) Date of Patent: Mar. 23, 2021

(54) ID TOKEN HAVING A PROTECTED MICROCONTROLLER

(71) Applicant: Bundesdruckerei GMBH, Berlin (DE)

(72) Inventors: Frank Morgner, Gruenheide (DE); Micha Kraus, Berlin (DE); Paul Bastian, Berlin (DE)

(73) Assignee: BUNDESDRUCKEREI GMBH, Berlin (DE)

( * ) Notice: Subject to any disclaimer, the term of this patent is extended or adjusted under 35 U.S.C. 154(b) by 302 days.

(21) Appl. No.: 15/779,987

(22) PCT Filed: Dec. 13, 2016

(86) PCT No.: PCT/EP2016/080750
§ 371 (c)(1),
(2) Date: May 30, 2018

(87) PCT Pub. No.: WO2017/102699
PCT Pub. Date: Jun. 22, 2017

(65) Prior Publication Data
US 2018/0349647 A1    Dec. 6, 2018

(30) Foreign Application Priority Data
Dec. 15, 2015 (DE) ........................ 10 2015 225 275

(51) Int. Cl.
*G06F 21/74* (2013.01)
*G06F 21/83* (2013.01)
(Continued)

(52) U.S. Cl.
CPC ............ *G06F 21/74* (2013.01); *G06F 21/83* (2013.01); *G06K 19/0716* (2013.01); *H04L 63/083* (2013.01); *H04L 63/0861* (2013.01)

(58) Field of Classification Search
CPC ..... G06F 21/74; G06F 21/83; G06K 19/0716; H04L 63/083; H04L 63/0861
See application file for complete search history.

(56) References Cited

U.S. PATENT DOCUMENTS 7,762,470 B2 *   7/2010  Finn ...................... H04H 60/74
                                                          235/492
9,898,695 B2 *   2/2018  Suwald ................. G07F 7/0853
(Continued)

FOREIGN PATENT DOCUMENTS

| DE | 102011082101 A1 | 3/2013 |
| DE | 102015202308 A1 | 8/2016 |
| EP | 2575084 A1 | 4/2013 |

OTHER PUBLICATIONS

Search Query Report from IP.com (performed Nov. 13, 2020) (Year: 2020).*

(Continued)

*Primary Examiner* — Sharon S Lynch
(74) *Attorney, Agent, or Firm* — Harness, Dickey & Pierce, P.L.C.

(57) ABSTRACT

An ID token includes a sensor, a communication interface, and a first microcontroller. The ID token includes a protected second microcontroller having at least one microcontroller communication interface, which is arranged in a holder of the ID token, wherein the microcontroller communication interface provides a data input and a data output. The first microcontroller is configured as a proxy for switching between the sensing of the measurement data by the sensor and forwarding of the sensed measurement data from the sensor to the first application of the protected second microcontroller by the microcontroller communication interface thereof on the one hand and forwarding of notifications for establishing a connection between the second application and the reading device and/or forwarding of APDUs by the (Continued)

Figure 1:
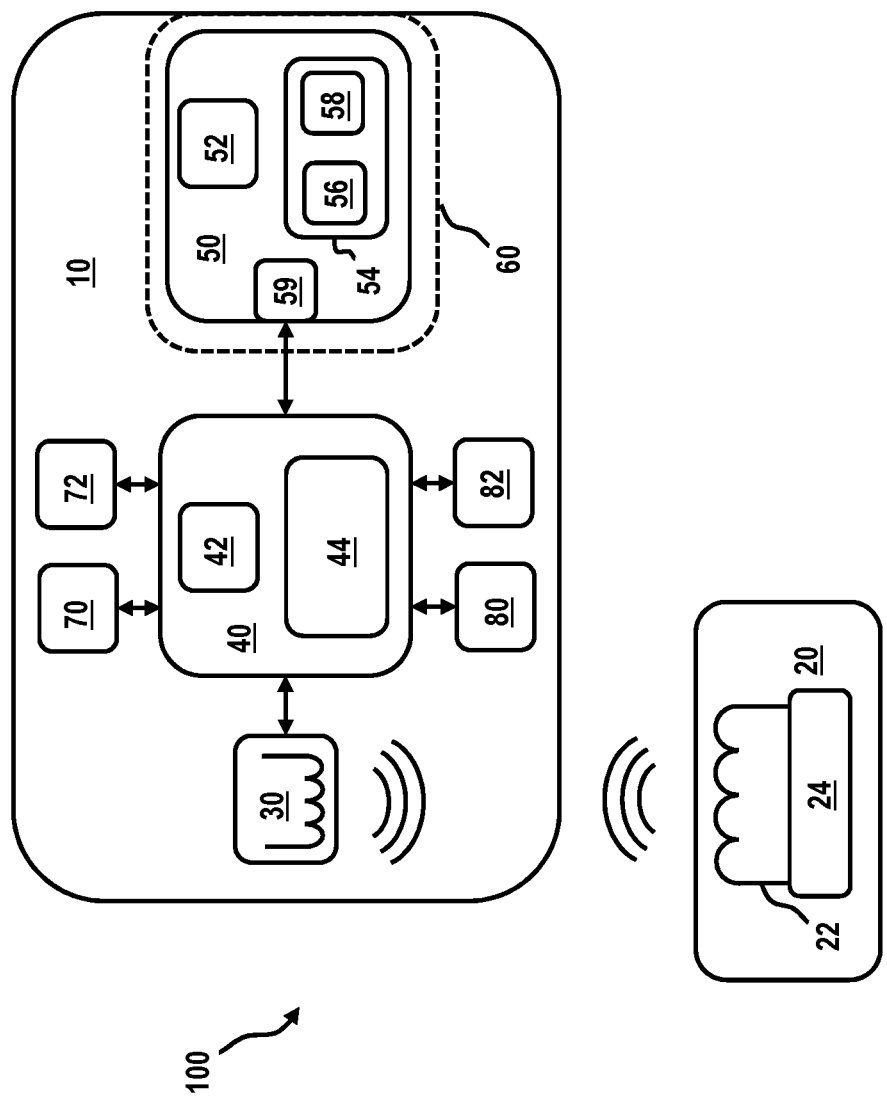

connection between the second application and the reading device on the other hand.

20 Claims, 4 Drawing Sheets

(51) Int. Cl.
  *G06K 19/07* (2006.01)
  *H04L 29/06* (2006.01)

(56) References Cited

U.S. PATENT DOCUMENTS

| | | | |
|---|---|---|---|
| 2006/0155913 A1* | 7/2006 | Nishikawa | G06K 19/07741 711/100 |
| 2006/0208066 A1* | 9/2006 | Finn | H04H 60/63 235/380 |
| 2013/0086389 A1* | 4/2013 | Suwald | G06Q 20/341 713/185 |
| 2014/0019746 A1* | 1/2014 | Hans | H04W 4/80 713/150 |
| 2016/0267486 A1* | 9/2016 | Mitra | H04L 9/0838 |
| 2018/0018663 A1* | 1/2018 | Van | H04L 9/3263 |

OTHER PUBLICATIONS

International Preliminary Report for Application No. PCT/EP2016/080750 dated Jun. 28, 2018.
"Smart Cards; Remote APDU structure for UICC based applications (Release 11); ETSI TS 102 226 v11.2.0", Jan. 31, 2013 (Jan. 31, 2013), pp. 2013-1, XP055149593, Retrieved from the Internet <URL:http://www.etsi.org/deliver/etsi_ts/102200_102299/102226/11.02.00_60/ts_102226v110200p.pdf> [retrieved on Oct. 29, 2014].
"Smart Cards; Secure channel between a UICC and an end-point terminal (Release 7); ETSI TS 102 484", ETSI Standard, European Telecommunications Standards Institute (ETSI), Sophia Antipolis Cedex, France, vol. SCP-T, No. V7.3.0, Jan. 1, 2009 (Jan. 1, 2009), XP014042875.
International Search Report for PCT/EP2016/080750, PCT/ISA/210 dated Mar. 13, 2017.
Written Opinion of the International Searching Authority for PCT/EP2016/080750, PCT/ISA/237 dated Mar. 13, 2017.
Extended European Search Report for corresponding European Application No. 18182580.3 dated Nov. 20, 2018.

* cited by examiner

ID TOKEN HAVING A PROTECTED MICROCONTROLLER

The invention relates to an ID token, comprising a sensor, a communication interface, and a first microcontroller, wherein the ID token comprises a protected second microcontroller having at least one microcontroller communication interface, which is arranged in a holder of the ID token, wherein the microcontroller communication interface provides a data input and a data output. The invention additionally relates to a method for checking measurement data of the sensor of an ID token according to the invention, and a system which comprises an ID token according to the invention of this kind and a reading device having a communication interface for data exchange with the communication interface of the ID token.

ID tokens for identifying or authenticating an owner of the corresponding ID token are known from the prior art, for example in the form of documents, such as personal identification documents and passports, but also access cards, which are intended for example to allow a certain person access to a secure area, or signature cards, with which an electronic document can be signed.

In the case of an automated, electronic checking of ID tokens of this kind, there is the problem in the prior art that the corresponding documents might not necessarily be able to be used only by the person for whom the ID tokens were provided. From the viewpoint of an electronic system with which the ID token is used for identification or authentication, the identity of the user is defined solely from the used ID token. For example, any other person can use a found ID token, such as an access card, in order to gain access to a locked area.

A solution to this problem is offered for example by an additional authentication process, in which an additional security attribute, for example a PIN or a biometric feature is requested from the user of the ID token and is not proven simply by the possession of the ID token. For example, in this case the user of the ID token is requested to input a corresponding additional security attribute at a terminal or another external device.

A further problem in the prior art is constituted by possible attempts of manipulation of the ID token. An unauthorised individual, by means of corresponding manipulations of the ID token, can thus attempt to gain access to the attributes for identification or authentication stored on the ID token. In particular, there is the risk that the ID token will be manipulated in such a way that it confirms the presence of an additional security attribute of the above-described type, although this is not actually the case.

An exemplary scenario for this would be an unauthorised third party who replaces an additional security attribute of the authorised user of the ID token stored on the ID token, for example a PIN or a biometric feature, with a security attribute selected by the unauthorised third party, for example a new PIN or a biometric feature of an unauthorised user. In spite of the additional security attribute, there is thus still a risk of misuse.

In order to increase the security of an ID token to manipulation attempts of this kind, the use of a protected microcontroller on the ID token and/or of an encryption of the communication of the ID token with external devices, such as reading devices, is recommended, for example. For protection against unauthorised access, protected microcontrollers have limited physical access possibilities. Particularly secure microcontrollers are thus known, which for example have precisely one communication interface for contact-based communication with external elements, wherein the communication interface provides precisely one data input and one data output.

Due to the limited communication possibilities of a protected microcontroller of the above-described kind, however, said microcontroller on the one hand cannot be used to exchange data with a reading device, and on the other hand cannot be used to check an additional security attribute, for example a PIN or a biometric feature, by means of a corresponding sensor.

The possibilities that remain are either to use an ID token effectively secured against manipulation, wherein the identity of the actual user of the ID token is unknown, or to use an ID token supposedly protecting the identity of the actual user by means of an additional security attribute, wherein, however, the ID token remains susceptible to manipulation. Neither of these two possibilities can effectively prevent misuse in the form of unlawful use.

Furthermore, an input of the additional features, such as a biometric feature or a PIN, at the terminal or another external device is at the risk of a possible skimming attack. The user cannot detect from outside whether the input device has been subject to manipulations by means of which an attacker can record/intercept the additional features.

The object of the present invention is to prevent the problem described at the outset of unlawful use of an ID token.

This object is achieved by the features of the independent claims. Embodiments of the invention are described in the dependent claims. Unless expressly stated otherwise, embodiments of the invention can be freely combined with one another.

An "ID token" is understood here in particular to mean a portable electronic device which comprises at least one protected electronic data memory for storing attributes and a communication interface for reading the attributes. The memory area is protected in order to prevent the attributes stored in the memory area from being changed without permission or read without the authorisation necessary for this purpose. In other words, the memory area can only be accessed when the access authorisation necessary for this is given.

In particular, the ID token can be a USB stick or a document, in particular a document of value or security document, for example in the form of a chip card. In accordance with the invention, a "document" is understood to mean paper-based and/or plastic-based documents, for example electronic identification documents, in particular passports, personal identification cards, visas and drivers licenses, vehicle registration documents, vehicle titles, company identification documents, health insurance cards or other ID documents, and also chip cards, in particular an access card or signature card, payment means, in particular banknotes, bank cards and credit cards, waybills or other proofs of authorisation, in which there is integrated a data memory for storing at least one attribute.

The ID token can be a hardware token or a soft token, if bound cryptographically to a hardware token, that is to say for example to what is known as a secure element. In particular, a soft token of this kind bound cryptographically to a secure element can be produced in accordance with DE 10 2011 082 101.

An "attribute" is understood generally to mean a data value, for example a number or a text. The attribute can be a piece of information with regard to the identity of a user to whom the ID token is assigned, in particular with regard to what is known as the digital identity of said user. For example, the surname, first name, or address of the user can constitute attributes. An "attribute" here in particular is understood to mean data relating to the user of the ID token or the ID token itself, in particular personalisation data, such as personal data of the user, a period of validity, or the issuer of the ID token or a piece of payment information, such as credit card data or other data for an electronic payment system. An attribute can also include data used to check the authorisation of the user to utilise a specific online service, for example the age of the user if the user wishes to use an online service reserved for a specific age group, or another attribute documenting the affiliation of the user to a specific group authorised for use of the online service. An "attribute" can also denote a data value which comprises authorisation to access an access-restricted security system. In this regard, the attribute can also specify the affiliation to a certain group, wherein the access to the access-restricted security system is dependent on the affiliation to said group.

A "reading device" is understood here to mean an electronic device which enables read access and also write access to the ID token, in particular a terminal, for example in the form of what is known as a chip card terminal. The reading device can form an integral part of a user computer system or can be formed as a separate component, for example as a peripheral device of the user computer system. In particular, the reading device can be what is known as a class 1, 2 or 3 chip card reading device. The reading device can be equipped with a contactless and/or contact-based interface for data exchange with an ID token.

A "microcontroller" or system-on-a-chip (SoC) is understood here to mean a semi-conductor chip which comprises at least a processor, a communication interface and a memory.

A "protected microcontroller" denotes a microcontroller having physically limited access possibilities. In particular, what is understood here by a protected microcontroller is a microcontroller having precisely one communication interface for contact-based communication with external elements, wherein the communication interface provides precisely one data input and one data output. A protected microcontroller may additionally have additional measures against misuse, in particular against unauthorised access to data in the memory of the microcontroller. For example, a protected microcontroller comprises sensors for monitoring the state of the microcontroller and surroundings thereof so as to identify deviations from normal operation, which can indicate manipulation attempts. Corresponding sensor types for example comprise a clock frequency sensor, a temperature sensor, a voltage sensor and/or a light sensor. Clock frequency sensors, temperature sensors and voltage sensors for example sense deviations from the clock frequency, temperature and/or voltage above or below a predefined normal range. In addition, a protected microcontroller can comprise a non-volatile electronic memory with a protected memory area.

Furthermore, a protected microcontroller can comprise means for cryptographic data protection, for example a random number generator, a generator for cryptographic keys, a hash generator, an encryption/decryption module, a signature module, certificates, and/or one or more non-migratable cryptographic keys, for example what is known as an Endorsement Key, Storage Root Key and/or Attestation Identity Keys.

A "non-volatile electronic memory" is understood here to mean a memory for storing data, in particular attributes, which is also referred to as a non-volatile memory (NVM). In particular, the memory in this case can be an EEPROM, for example a flash EEPROM, referred to as a flash for short.

A "protected memory area" is understood here to mean an area of an electronic memory to which access, that is to say read access or write access, by a processor coupled to the memory is made possible only when a condition necessary for this is satisfied. For example, this can be a cryptographic condition, in particular a successful authentication and/or a successful authorisation check. The memory can be configured such that access to the protected memory area is possible only via the coupled processor. In particular, a "protected memory area" of an ID token is understood to mean an electronic memory in which data are stored, for example an attribute and/or a data structure, which can be read from the electronic memory by a reading device, deleted or modified only when the reading device has authenticated itself to the ID token and/or has proven to the ID token its authority to read, delete and/or write the data in question, for example with the aid of an authentication certificate in which such rights of the reading device are specified. For example, the electronic memory can be an EEPROM, in particular a flash EEPROM.

A "processor" is understood here to mean a logic circuit used to execute program instructions. The logic circuit can be implemented on one or more discrete components, in particular on a chip.

A "communication interface" is understood here to mean an interface via which data can be received and sent, wherein the communication interface can be configured in a contact-based manner or contactlessly, for example in accordance with an RFID and/or NFC standard.

An "application" is understood here, without limitation, to mean any type of computer program which comprises machine-readable instructions for controlling a functionality of the ID token.

A "proxy" is understood here to mean a switching element which is configured to produce a data connection between a receiver and a transmitter of data and to switch over to one or more other data connections which connect the same receiver or transmitter to another transmitter or receiver.

A "sensor" is understood here to mean an element for sensing measurement data. Measurement data are data that qualitatively or quantitatively express physical or chemical properties of a measurement object, for example a quantity of heat, temperature, moisture, pressure, sound field parameters, brightness, acceleration, pH value, ion strength, electrochemical potential and/or material characteristics thereof. Measurement data are sensed by means of physical or chemical effects and are converted into an electronically processible electrical signal. In addition, sensors in particular also comprise elements for sensing an input of information, for example a keyboard, keypad, mouse, touchscreen and/or elements for sensing gestures.

An "encrypted end-to-end connection" is understood here to mean a connection between a transmitter and a receiver with end-to-end encryption, in which data to be transmitted are encrypted by the transmitter and are only decrypted again by the receiver. Transmitted data are thus encrypted across all transmission stations, such that intermediate stations do not have any knowledge of the content of the transmitted data, on account of the encryption. The connection is cryptographically secured by the encryption so as to prevent exposure and/or manipulation of the transmission, wherein what is known as a Secure-Messaging method can be used for this purpose. A method for establishing an encrypted end-to-end connection of this kind between an ID token and a reading device is described for example in German patent application 10 2015 202 308.7.

A "certificate" is understood here to mean a digital certificate, which is also referred to as a Public Key certificate. A certificate constitutes structured data used to assign a public key of an asymmetric cryptosystem to an identity, for example a person or a device. Alternatively, certificates based on zero-knowledge crypto systems are also possible. For example, the certificate can correspond to standard X.509 or another standard. For example, the certificate is a Card Verifiable Certificate (CVC).

The attribute or attributes of the user, stored in the protected memory area of the ID token, for which a reading device is authorised to perform read access can be specified in the certificate. Furthermore, the respective write permissions for attribute specifications or attributes can also be defined in a certificate. A certificate of this kind is also referred to as an authorisation certificate. Furthermore, a certificate can specify whether an authentication with the on-chip sensors may be initiated by the terminal.

An "Application Protocol Data Unit" (APDU) is a communication unit of a communication between a chip card and a chip card application according to the ISO 7816 standard. An APDU is a communication unit at application level corresponding to layer 7 in the OSI layer model. A distinction can be made between command APDUs and response APDUs. Command APDUs transmit commands to the chip card, whereas the response APDUs transmit the chip card responses to corresponding commands. The structures of command APDU and response APDU are defined in the standard ISO 7816-4. A command APDU consists of a header comprising header data and an optional body comprising user data, the response data of the command, and an obligatory trailer. The trailer provides information regarding the successful processing of the command or the type of error preventing or interrupting said processing.

In the case of encrypted APDUs, the user data are in each case encrypted, whereas the header data remain unencrypted, so as to ensure a correct assignment and processing of the APDUs.

Communication based on a master/slave relationship between two or more subscribers is understood here to mean a data exchange in which precisely one subscriber takes on the role of the master and all further subscribers take on the role of slaves. The communication is implemented here with use of a question-response protocol, in which only the master as sole subscriber has the authorisation to initiate a data transmission from itself, i.e. to send a corresponding query to one of the slaves, whereas the slaves can merely reply with responses, but do not have the possibility to themselves actively intervene in the communication or initiate such communication.

A "logical channel" is understood to mean a local connection between two data end devices or network nodes, wherein a logical channel is realised by channel addresses in the transmitted data packets. Each channel is assigned a "context", which defines a state and/or an application of the target data end device or the target network node.

In one aspect, the invention relates to an ID token comprising a sensor, a communication interface, and a first microcontroller, wherein the ID token comprises a protected second microcontroller having at least one microcontroller communication interface, which is arranged in a holder of the ID token, wherein the microcontroller communication interface provides a data input and a data output, wherein the sensor is configured to sense measurement data, wherein the first microcontroller, for data exchange with the microcontroller communication interface of the protected second microcontroller, is connected to the sensor and to the communication interface of the ID token, and wherein the first microcontroller is configured to exchange data with a reading device via the communication interface of the ID token, wherein the protected second microcontroller comprises a first and a second application, wherein the first application is configured to compare the measurement data of the sensor with comparison data stored in a memory of the second microcontroller and to forward the comparison result to the second application, wherein the second application is configured to establish a connection to the reading device and to output specified data by a read command of the reading device, wherein the first microcontroller is configured as a proxy for switching between the sensing of the measurement data by the sensor and forwarding of the sensed measurement data from the sensor to the first application of the protected second microcontroller by means of the microcontroller communication interface thereof on the one hand and forwarding of notifications for establishing a connection between the second application and the reading device and/or forwarding of APDUs by means of the connection between the second application and the reading device on the other hand.

Embodiments can have the advantage that they offer effective protection against unlawful use of the ID token. On the one hand, an ID token according to the invention offers the possibility to check the presence of additional security attributes by means of the sensor and on the other hand allows the use of a protected microcontroller, which for example is configured to communicate in an encrypted manner with the reading device and at the same time offers a high level of security on account of the limited possibility for access. In accordance with embodiments, the memory of the second microcontroller comprises a protected memory area, in which at least one attribute of the ID token is stored. In accordance with embodiments the comparison data are stored in the protected memory area of the memory of the second microcontroller. In accordance with embodiments the ID token comprises a plurality of sensors.

Embodiments can have the advantage that manipulation of the sensor, for example for a skimming attack, is prevented by the use of a sensor integrated in the ID token.

The first microcontroller configured as a proxy allows a switchover between a data connection of the protected second microcontroller to one or more sensors of the ID token and a data connection of the second microcontroller to the reading device. In accordance with embodiments the first microcontroller for this purpose has a plurality of communication interfaces which provide a plurality of data inputs and data outputs.

The sensor offers the possibility to include additional external security attributes for checking authentication and/or authorisation. These security attributes can concern the identity of the user of the ID token, for example in the case of a fingerprint sensor, or knowledge of the user, for example a PIN keypad for inputting a PIN known only to the user, or ambient parameters, as are provided for example by a temperature sensor or a GPS receiver. The memory of the protected second microcontroller comprises comparison data for the measurement data to be sensed by the sensors in an application scenario predefined as permitted. If the sensed measurement data match the comparison data, it is assumed that a permitted application scenario is present. An application scenario of this kind for example is the use of the ID token by a person having a specific identity, by a person having specific knowledge, and/or a use of the ID token at a specific location.

The ID token or the two applications of the protected second microcontroller can be configured to communicate the results of the comparison check with the reading device and/or to transmit requested data to the reading device only following a successful comparison check, or to execute received commands only following a successful comparison check.

In accordance with embodiments, the second application is configured to establish a connection to the reading device in the form of an encrypted end-to-end connection and to output the data specified by a read command of the reading device via the encrypted end-to-end connection, wherein encrypted APDUs are transmitted via the encrypted end-to-end connection.

Embodiments can have the advantage that the data exchange between reading device and ID token, in particular the requesting of one or more attributes, can be effectively protected against unauthorised access, such as recording or interception attempts. At the same time, the configuration of the first microcontroller as a proxy makes it possible to request measurement data of the sensor by switching over the data connections in spite of the encryption of the data transmitted by the encrypted end-to-end connection.

In accordance with embodiments the first microcontroller is configured:
to receive and temporarily store a first request of the reading device to establish the connection between the second application and the reading device,
upon receipt of the first request, to send a second request to sense the measurement data to the sensor,
upon receipt of the second request, to receive the sensed measurement data from the sensor and to forward said data to the first application,
to forward the temporarily stored first request to the second application.

Embodiments can have the advantage that, in the event of a request of a certain application, for example the first application, measurement data can be requested by way of precaution from the first microcontroller, so that said data is available as necessary to the protected second microcontroller and the requested application can refer to said data in spite of limited access possibilities to the second controller and an encrypted data exchange (not discernible from outside) with the requesting reading device. The same is true even in the case of operation of the second microcontroller as a slave relative to a first microcontroller operated as master. In accordance with embodiments the first request of the reading device to establish the connection is a request to establish an encrypted end-to-end connection.

In accordance with embodiments the first microcontroller is configured:
to receive an unencrypted communication sent from the reading device to the second application during the course of the establishment of the encrypted end-to-end connection, and to temporarily store and analyse said communication,
if the communication comprises a reference to measurement data sensed by the sensor, to send a request to sense the measurement data to the sensor,
upon receipt of the request, to receive the sensed measurement data from the sensor and to forward said data to the first application,
to forward the temporarily stored unencrypted communication to the second application.

Embodiments can have the advantage that measurement data is requested by way of precaution only when there are indications that these data are actually incorporated in the communication via the encrypted end-to-end connection to be established.

In accordance with embodiments the unencrypted communication is a certificate which authorises the reading device to check the measurement data sensed by the sensor by means of the first application.

Embodiments can have the advantage that measurement data are requested by way of precaution only when a requesting reading device also has authorisation to access these measurement data. If this is not the case, the measurement data are not provided, whether requested or not.

In accordance with embodiments the first microcontroller is configured to receive all communications sent from the reading device to the second application during the course of the establishment of the encrypted end-to-end connection, and to temporarily store and forward said communications, wherein, once the measurement data have been forwarded, all temporarily stored communications are forwarded again to the second application.

Embodiments can have the advantage that, in the event that the establishing of the connection is interrupted, this can be efficiently resumed, even if the previously achieved state of establishment has been lost as a result of the interruption.

In accordance with embodiments the protected second microcontroller is configured to provide a plurality of logical channels for data exchange via the microcontroller communication interface, wherein the communication via the encrypted end-to-end connection is performed over a first logical channel of the second microcontroller, and wherein the first microcontroller is configured
to receive and temporarily store an encrypted APDU sent via the encrypted end-to-end connection from the reading device to the second application and containing unencrypted header data and encrypted user data, and to analyse the header data,
if the header data comprise a reference to measurement data sensed by the sensor, to send a request to sense the measurement data to the sensor,
upon receipt of the request, to receive the sensed measurement data from the sensor and to forward said data to the first application over a second logical channel of the second microcontroller,
to forward the temporarily stored encrypted APDU to the second application over the first logical channel.

Embodiments can have the advantage that the measurement data are requested only when this has actually been queried. In addition, it is ensured by the use of two logical channels that the established encrypted end-to-end connection is not interrupted, and instead can continue over another channel in the event of a switchover, without hindering the transmission of the measurement data. In addition, the analysis of the header data makes it possible to maintain the encryption, thus increasing security, however the first microcontroller is nevertheless able to identify a request of measurement data of the sensor. In accordance with embodiments the data transmission over the first logical channel is interrupted during the transmission of the measurement data over the second logical channel and is continued once the measurement data transmission is complete, wherein the first logical channel remains in force during the interruption. Here, the switchover is controlled via the first microcontroller, which for example acts as a master, whereas the protected second microcontroller takes on the role of a slave.

In accordance with embodiments the at least one microcontroller communication interface of the protected second microcontroller is a contact-based communication interface.

Embodiments can have the advantage that an interception and/or recording of transmitted data is made difficult, thus increasing security.

In accordance with embodiments the protected second microcontroller comprises precisely one microcontroller communication interface.

Embodiments can have the advantage that the physical access possibilities to the protected second microcontroller can be efficiently minimised, thus increasing security.

In accordance with embodiments the first microcontroller is configured to exchange data contactlessly with a reading device via the communication interface of the ID token.

Embodiments can have the advantage that the use of the ID token is simplified and does not first have to be brought into contact with the reading device. In particular, the process of checking the ID token can thus be accelerated, since the step of bringing into contact is spared. In addition, this allows the ID token to be kept without restrictions, such that one of the sensors is designed optimally to sense the measurement data. For example, the ID token can be held such that a fingerprint sensor of the ID token can be easily reached by the fingers of the user. In the case of a contact-based connection, the possibilities for positioning of the ID token are by contrast limited by the required contact.

In accordance with embodiments the first microcontroller is configured to exchange data with a reading device in a contact-based manner via the communication interface of the ID token.

Embodiments can have the advantage that an interception and/or recording of transmitted data is made difficult, thus increasing security.

In accordance with embodiments the second application comprises the first application.

Embodiments can have the advantage that the functionality of the first and second application on the protected second microcontroller are combined or integrated in a common application. In this case, the second application natively comprises the functionality of the first application, or vice versa, whereby there is no need for separate implementation of this functionality in a separate, independent application.

In accordance with embodiments the first and second application are separate, independent applications. Embodiments can have the advantage that all applications wishing to request the further features forward this request to a central application, i.e. the first application, and therefore only this one central application also takes on the tasks of management and checking.

In accordance with embodiments the measurement data are constituted by one or more biometric features, a PIN, acceleration data, GPS coordinates and/or temperature data.

Embodiments can have the advantage that the voice or identity of the actual user of the ID token, can be checked by biometric features, such as fingerprints or a frequency pattern. A PIN checks whether the user has the necessary knowledge for lawful use of the ID token. Acceleration data can be used for example in order to identify the user on the basis of movement patterns. The location of use of the ID token can be determined via the GPS coordinates. Ambient conditions can be checked by means of the temperature, for example in order to determine the actual location of use of the ID token. In addition, in combination with a fingerprint sensor it is possible for example to test whether a finger is actually arranged on the sensor at the time of sensing of the measurement data.

In accordance with embodiments the ID token comprises a plurality of different sensors for sensing a plurality of different items of measurement data, to which the first microcontroller is connected for data exchange, wherein the first application is configured to compare the measurement data of each sensor with comparison data stored in a memory of the second microcontroller and to forward the comparison results to the second application.

Embodiments can have the advantage that a complex use scenario can be defined, in which use of the ID token is permitted. In order to confirm an identity and/or authorisation by means of the ID token, a plurality of different items of measurement data sensed by means of different sensors for example must be correct, i.e. must match predefined comparison data. In addition, graded security levels can be defined. For simple access to a building and/or computer system, the knowledge of a PIN can be sufficient, and for a legally binding digital signature this knowledge may be necessary in conjunction with a confirmation of the identity of the user via one or more biometric features.

In accordance with embodiments the first microcontroller is configured as a master and the protected second microcontroller is configured as a slave.

Embodiments can have the advantage that they increase the security since the security-sensitive second microcontroller cannot actively intervene in the communication. The second microcontroller therefore cannot be manipulated to transmit invalid data.

In accordance with embodiments the second microcontroller is physically protected by one or more of the following elements: a clock frequency sensor, a temperature sensor, a voltage sensor, and/or a light sensor.

Embodiments can have the advantage that these sensors offer an effective possibility for monitoring the state of the second microcontroller and surroundings thereof, and thus make it possible to identify physical manipulation attempts in good time.

In accordance with embodiments the second microcontroller is cryptographically protected by one or more of the following elements: a random number generator, a generator for cryptographic keys, a hash generator, an encryption/decryption module, a signature module, one or more certificates and/or one or more non-migratable cryptographic keys.

Embodiments can have the advantage that both the data storage and the data transmission by means of the second microcontroller satisfy high cryptographic security requirements.

In accordance with embodiments the microcontroller communication interface of the protected second microcontroller is hard-wired to the first microcontroller.

Embodiments can have the advantage that a removal of the protected second microcontroller from the ID token for the purposes of manipulation is made difficult. In particular, the wiring can be such that removal without destruction, with the microcontroller communication interface remaining functional, is prevented.

In accordance with embodiments the protected second microcontroller is configured as an exchangeable module and the holder of the ID token is configured as a plug-in connection for the module, wherein the microcontroller communication interface of the protected second microcontroller is releasably contacted with the first microcontroller.

Embodiments can have the advantage that the ID token can be used as a platform for use with different protected second microcontrollers. This increases in particular the compatibility with developments of the protected microcontroller and additionally allows standardised mass production.

In accordance with embodiments the ID token has an output device to which the first microcontroller is connected for data exchange.

Embodiments can have the advantage that they simplify operation of the ID token and provide instructions for use of the sensors and information regarding the state of use of the ID token. This is advantageous in particular in the case of a plurality of sensors. Corresponding output devices can be a display or LEDs, for example. In particular, the sensor can also be integrated in an output device, for example a touch-sensitive display.

In a further aspect the invention relates to a system which comprises an ID token according to any one of the preceding claims and a reading device having a communication interface for data exchange with the communication interface of the ID token, wherein the reader is configured to establish a connection to the second application of the protected second microcontroller and to send APDUs to the second application and/or to receive APDUs from the second application via the established connection.

Embodiments can have the advantage that a system for efficiently and securely checking access authorisation, for securely processing payments and/or for securely digitally signing electronic documents is provided. To this end, the reading device is for example part of an access control device, a terminal and/or a user computer system.

In a further aspect the invention relates to a method for checking measurement data of the sensor of an ID token according to any one of the device claims by means of the protected second microcontroller, wherein the method comprises transmitting a request to establish a connection between the reading device and the second application of the protected second microcontroller:
receiving the request by the first microcontroller via the communication interface of the ID token,
forwarding the request by the first microcontroller to the second application of the protected second microcontroller via the microcontroller communication interface of the protected second microcontroller,
establishing the connection between the reading device and the second application:
exchanging communications in order to establish the connection between the reading device and the second application via the communication interface of the ID token, the first microcontroller, and the microcontroller communication interface of the protected second microcontroller,
exchanging APDUs via the connection between the reading device and the second application:
receiving a command APDU by the first microcontroller via the communication interface of the ID token, wherein the command APDU requests the comparison results of the comparison, performed by the first application, of measurement data sensed by the sensor with comparison data,
forwarding the command APDU by the first microcontroller to the second application via the microcontroller communication interface of the protected second microcontroller,
creating a response APDU to the received command APDU by the second application with use of the comparison result received from the first application,
receiving the response APDU by the first microcontroller,
forwarding the response APDU by the first microcontroller to the reading device via the communication interface of the ID token,
providing the comparison result for the detected measurement data:
sending a request to sense the measurement data to the sensor by the first microcontroller,
sensing the measurement data by the sensor,
receiving the sensed measurement data by the first microcontroller,
forwarding the sensed measurement data by the first microcontroller to the first application via the microcontroller communication interface of the protected second microcontroller,
receiving the sensed measurement data by the first application and comparing said data with the stored comparison data,
forwarding the comparison result to the second application.

Embodiments can have the advantage that they provide a method for checking measurement data of the sensor of an ID token, which method at the same time offers effective protection against unlawful use of the ID token.

In accordance with embodiments the connection established between the reading device and the second application is an encrypted end-to-end connection, wherein encrypted APDUs in the form of encrypted command APDUs and encrypted response APDUs are exchanged via the encrypted end-to-end connection.

Embodiments can have the advantage that they provide a data transmission secured against interception and/or recording. In accordance with embodiments, unencrypted communications are exchanged between the reading device and the second application via the communication interface of the ID token in order to establish the encrypted end-to-end connection.

In accordance with embodiments the request to establish the connection between the reading device and the second application of the protected second microcontroller is temporarily stored by the first microcontroller, wherein the comparison result for the sensed measurement data is provided upon receipt of the request and the temporarily stored request is forwarded to the second application once the sensed measurement data have been forwarded by the first microcontroller.

Embodiments can have the advantage that measurement data are provided by way of precaution, such that the protected second microcontroller can have said data available or can access said data as required.

In accordance with embodiments, unencrypted communications to establish the connection received from the reading device are temporarily stored by the first microcontroller, wherein the first microcontroller analyses the temporarily stored unencrypted communications, interrupts the forwarding of the corresponding communication if reference to measurement data sensed by the sensor is detected in an unencrypted communication, and causes the comparison result for the sensitive measurement data to be provided, wherein temporarily stored communications already forwarded are forwarded again to the second application once the sensed measurement data have been forwarded by the first microcontroller, and the interrupted forwarding is continued.

Embodiments can have the advantage that measurement data are provided by way of precaution only when it is foreseeable that said data will also actually be required with a certain level of likelihood. For example, the analysed communication is a certificate of the reading device, and the measurement data are provided only when the reading device also has the necessary authorisation to access these measurement data.

In accordance with embodiments encrypted APDUs are sent and received by the protected second microcontroller over a first logical channel, wherein the first microcontroller analyses the command APDUs received in the form of unencrypted header data, interrupts the forwarding of the corresponding command APDU in the event that a reference to measurement data sensed by the sensor is detected in the unencrypted header data of an encrypted command APDU and causes the comparison result for the sensed measurement data to be provided, wherein the sensed measurement data are forwarded to the first application over a second logical channel, wherein the interrupted forwarding over the first logical channel is continued once the sensed measurement data have been forwarded by the first microcontroller over the second logical channel.

Embodiments can have the advantage that measurement data is provided only as required. An efficient provision in spite of the encryption of the APDUs and limited access possibilities to the protected second microcontroller is made possible.

In accordance with embodiments a context of the protected second microcontroller is assigned to each of the logical channels, and the second microcontroller is configured to switch between the individual contexts depending on the logical channel over which the communication with the first microcontroller occurs.

Embodiments of the invention can have the advantage that the encrypted end-to-end connection between the reading device and the second application can be maintained whilst the measurement data are requested, transmitted and compared.

Figure 2:
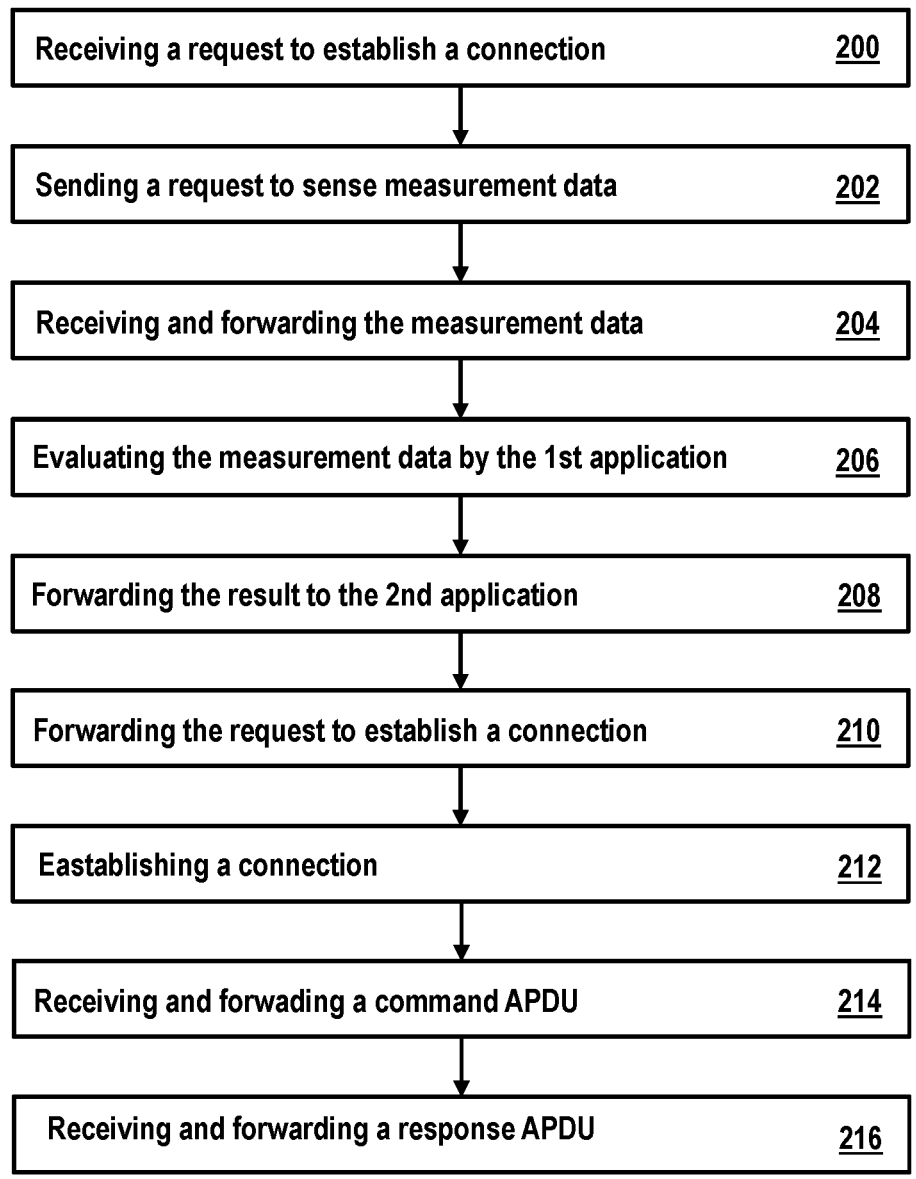
Figure 3:
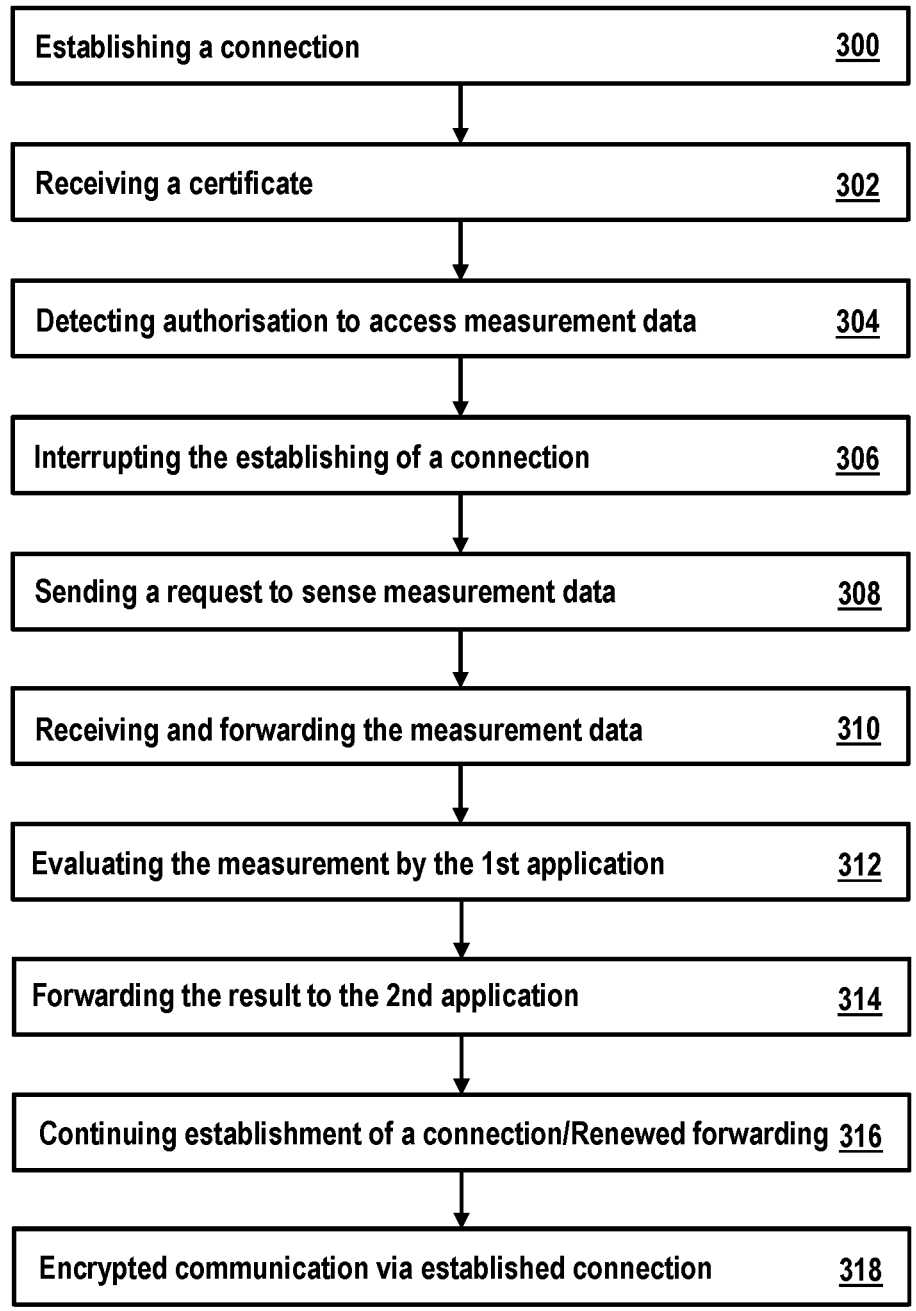
Figure 4:
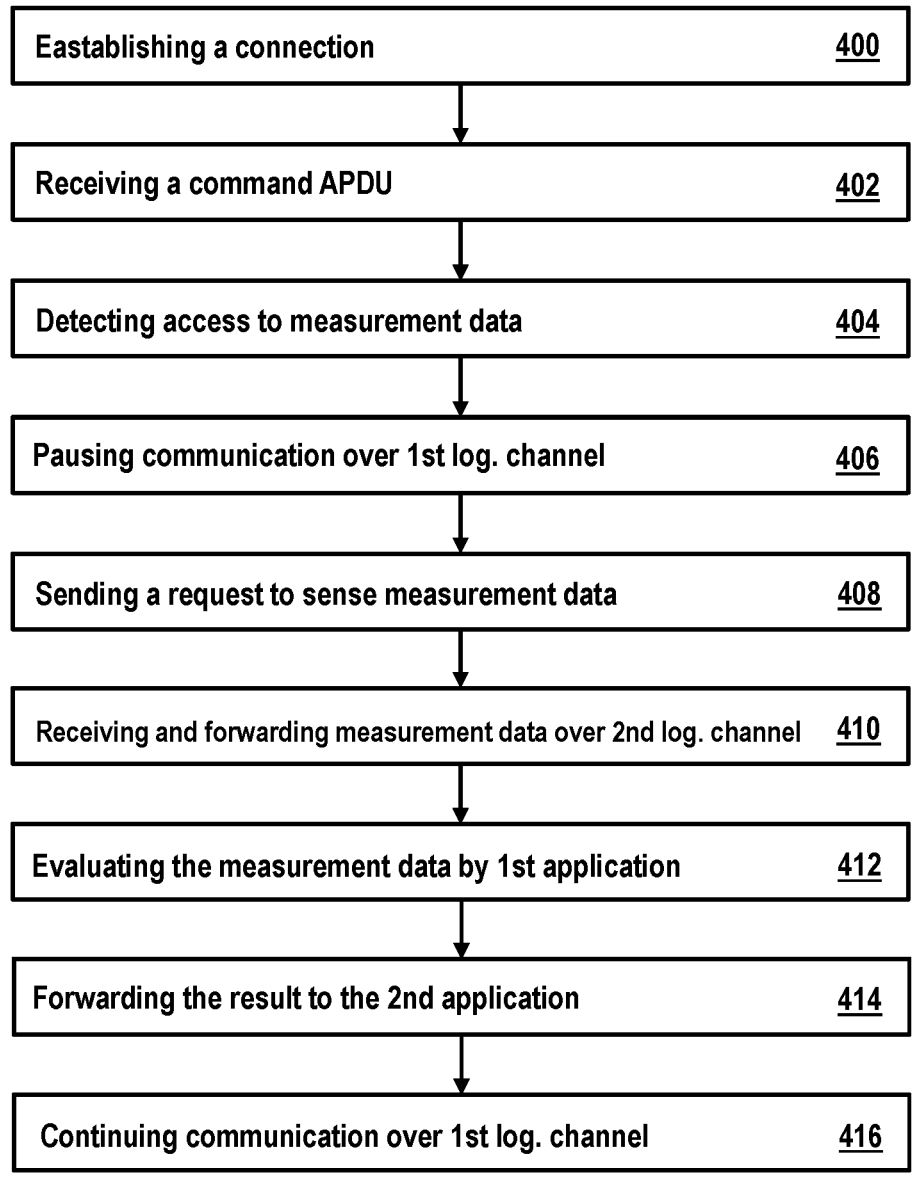

Preferred embodiments of the invention will be explained in greater detail hereinafter with reference to the drawings, in which:

FIG. 1 shows a schematic block diagram of an exemplary ID token according to the present invention, FIG. 2 shows a flow diagram for a first exemplary method for operating an ID token according to the invention, FIG. 3 shows a flow diagram for a second exemplary method for operating an ID token according to the invention, and FIG. 4 shows a flow diagram for a third exemplary method for operating an ID token according to the invention.

Hereinafter, similar elements will be denoted by like reference signs.

FIG. 1 shows a schematic block diagram of an exemplary ID token 10 according to the invention in combination with a reading device 20, which together form a system 100 according to the invention.

The ID token 10 comprises a first and a second microcontroller 40, 50. The first microcontroller 40 is configured to communicate, i.e. exchange data, contactlessly with the reading device 20 by means of an antenna module 30, which comprises an antenna. To this end, the reading device 20 is provided with an antenna 22. The first microcontroller 40 comprises a processor 42 and a memory 44. The memory 44 comprises machine-readable instructions, which, when executed by the processor 42, prompt the first microcontroller 40 to control the communication of the protected second microcontroller 50 with the reading device 20 and the sensors 70, 72 and the output devices 80, 82. The ID token 10 also comprises the aforementioned sensors 70, 72, which for example are a fingerprint sensor 70 and a PIN keypad 72. In accordance with embodiments the sensors can also be other known types of sensors, for example a microphone, a gyroscope, an acceleration sensor, a GPS receiver and/or a thermometer. In accordance with embodiments, however, these sensors can also be provided additionally to the two sensors 70, 72. In addition, the ID token 10 comprises output devices, for example a display 80 and LEDs 82. The display 80 for example can be controlled by the first microcontroller 40 in such a way that it requests the user of the ID token 10 to place one or more fingers on the fingerprint sensor 70 or to input a PIN via the PIN keypad 72. The LEDs 82 make it possible to signal to the user that the sensors 70 and/or 72 are ready for use and/or that a fingerprint has been fully captured or a PIN has been fully input and/or that an error has occurred. This can be indicated for example by means of different colours in which the LEDs 82 light up. In accordance with embodiments the ID token 10 and in particular the LEDs 82 can also be configured to show when the results of the data comparison performed by the first application 56 of the protected second microcontroller 50 is positive.

The ID token 10 also comprises a holder 60 for a second microcontroller, in which a protected second microcontroller 50 is arranged. The second microcontroller 50 is on the one hand protected in that it has only a single contact-based microcontroller communication interface 59 for communicating or exchanging data with external elements, i.e. the first microcontroller 40, wherein the microcontroller communication interface 59 has precisely one data input and one data output. On the other hand, the second microcontroller 50 can be physically and cryptographically protected. For example, the microcontroller 50 in accordance with embodiments comprises a clock frequency sensor, a temperature sensor, a voltage sensor, and/or a light sensor. The microcontroller 50, in order to provide cryptographic security, in accordance with embodiments for example also comprises a random number generator, a generator for cryptographic keys, a hash generator, an encryption/decryption module, a signature module, one or more certificates and/or one or more non-migratable cryptographic keys. In addition, the protected second microcontroller 50 comprises a processor 52 and a memory 54 with a first and a second application 56, 58. In addition, the memory 54 comprises the comparison data (not shown) for the measurement data of the sensors 70, 72. The comparison data for example can be constituted by fingerprints or characteristic feature specifications of fingerprints of one or more users assigned to the ID token 10. Furthermore, the comparison values may comprise one or more PINs. The PINs in accordance with embodiments can be stored as ciphers on the memory 54, such that it is necessary either to also cipher the sensed measurement data for comparison with the ciphers or to decipher the stored ciphers. In accordance with embodiments the memory 54 can be a protected memory. For example, the memory 54 can be accessed only when access authorisation necessary for this is given. In addition, in accordance with embodiments, the memory 54 can be accessed only via the processor 52.

The first application 56 comprises machine-readable instructions which prompt the second microcontroller 50, when they are executed by the processor 52, to compare the sensed measurement data of the sensors 70, 72, which data were forwarded from the first microcontroller 40 to the first application 56, with the comparison values stored in the memory 54. The comparison results are transmitted from the first application 56 to the second application 58 via an inter-applet communication (IAC). In accordance with embodiments the first application 56 can also be integrated in the second application 58. The second application 58 is configured to establish an encrypted end-to-end connection to the reading device 20. Encrypted APDUs are exchanged between the reading device 20 and the second application 58 via the encrypted end-to-end connection. Here, the reading device 20 for example sends command APDUs to the second application 58, to which said second application responds with a corresponding response APDU.

The ID token 10 also may comprise a power source (not shown), which is configured to supply power at least to the sensors 70, 72 and the display devices 80, 82. For example, the power source can be a battery or a device for energy harvesting. For example, piezoelectric crystals, thermoelectric generators, or the like can be used for this purpose.

The reading device 20 comprises a cryptographic circuit 24, which is configured to communicate contactlessly with the first microcontroller 40 of the ID token 10 by means of an antenna 22. For example, the reading device 20 can be an RFID reading device. Here, the communication between the reading device 20 and the ID token 10 can be performed for example wirelessly at a frequency of 13.56 MHz in accordance with standard ISO 14443.

The reading device 20 for example can be part of an access control system, wherein a user has to switch an access control device into a release estate by means of the ID token 10 in order to gain access. To this end, an attribute for example is stored in the protected memory 54 of the protected second microcontroller 50, which attribute is to be read out by the reading device 20 and compared with a comparison attribute. Only in the event of a match between the attribute read out from the protected memory area 54 and the comparison attribute of the reading device 20 is the access control device switched into a release state. In addition, identification of the user by means of a biometric feature such as a fingerprint and/or knowledge of a PIN as access prerequisite it is necessary. To this end the user must have his fingerprint scanned via the fingerprint sensor 70 and/or must input a PIN via the PIN keypad 72. The measurement data sensed by the sensors 70, 72 are forwarded to the first application 56 of the protected second microcontroller 50 via the first microcontroller 40. The first application 56 is executed by the processor 52 and compares the sensed measurement data with the comparison data stored in the protected memory 54. The comparison result is transmitted to the second application 58 from the first application 56 by an inter-applet communication and is forwarded to the reading device 20 via the encrypted end-to-end connection. Only in the event of a positive comparison result is the access control device switched into a release state. In accordance with embodiments the comparison result is not communicated to the reading device 20, rather the second application 58 is configured in such a way that the attribute requested by the reading device 20 is only transmitted to the reading device 20 on the condition that the comparison result is positive.

FIG. 2 shows a flow diagram for a first exemplary method for operating the ID token 10 according to the invention from FIG. 1.

In block 200 the first microcontroller 40 by means of the antenna module 30 receives a first request, directed to the second application 58 of the protected second microcontroller 50, to establish an encrypted end-to-end connection. The received request is temporarily stored by the first microcontroller 40 and the forwarding thereof is interrupted. Upon receipt of the first request, the first microcontroller 40 sends a second request in block 202 for the sensing of measurement data to the fingerprint sensor 70 and/or the PIN keypad 72. The user is requested, for example via the display 80, to place a finger on the fingerprint sensor 70 and/or to input a PIN via the PIN keypad 72. The corresponding measurement data are sensed by the sensors 70, 72 and transmitted in block 204 to the first microcontroller 40, which forwards these data to the first application 56 via the microcontroller communication interface 59. In block 206 the first application 56 compares the captured measurement data with the comparison data stored in the memory 54. The comparison result is transmitted in block 208 from the first application 56 to the second application 58 of the protected second microcontroller 50, for example by an inter-applet communication, and is thus made available. The transmission can be performed directly following completion of the comparison, or the first application 56 can temporarily store the comparison results and transmit said results to the second application 58 as required, for example in response to a corresponding request. In accordance with this method, the sensing, forwarding and processing of measurement data is thus performed always when the reading device 20 attempts to read the protected second microcontroller 50, i.e. initiates establishment of a connection to the second application 58. This is the case regardless of whether or which of the sensed measurement data are actually required later during the course of the communication between the reading device 20 and the second application 58.

Once the measurement data have been forwarded by the first microcontroller 40, the first request to establish the encrypted end-to-end connection is forwarded in block 210 from the first microcontroller 40 to the second application 58. The first microcontroller 40 is configured here as a proxy, which switches over between the forwarding of the first request and the forwarding of measurement data and thus controls the data stream from various data sources physically separate from one another, i.e. the reading device 20 and the sensors 70, 72, to the protected second microcontroller 50. In block 212 the encrypted end-to-end connection is established for example by the exchange of certificates and/or cryptographic keys between the reading device 20 and the second application 58. The connection is established for example in accordance with the protocol described in German patent application 10 2015 202 308.7. Following the establishment of the encrypted end-to-end connection, encrypted APDUs are sent over said connection between the reading device 20 and the second application 58. For example, an encrypted command APDU is sent in block 214 from the reading device 20 to the second application 58 and is received over its transmission path by the first microcontroller 40 and is forwarded. This encrypted command APDU may request the comparison result for the sensed sensor data and/or may request an attribute, which is output only following a positive comparison result. In block 216 a response APDU, which is generated by the second application 58 as response to the command APDU with use of the comparison results and which for example includes the comparison results and/or a requested attribute is received over its transmission path by the first microcontroller 40 and is forwarded to the reading device 20.

FIG. 3 shows a flow diagram for a second exemplary method for operating the ID token 10 according to the invention from FIG. 1.

In block 300 the encrypted end-to-end connection is established for example by the exchange of certificates and/or cryptographic keys between the reading device 20 and the second application 58. The communications sent from the reading device 20 to the second application 58 and responses thereto are stored temporarily and analysed here by the first microcontroller 40, which receives them and forwards them on. Here, certain predefined keywords or functionalities which are related to the measurement data of the sensors 70, 72 are sought for example. For example, a certificate is received in block 302 from the reading device 20 by the first microcontroller 40. The content of this certificate is analysed and, if it comprises a reference to the measurement data of the sensors 70, 72, this reference is detected in block 304. A reference of this kind for example can be an authorisation to access the corresponding measurement data. If no reference is detected, the establishment of a connection is continued by forwarding of the analysed communication, and otherwise the forwarding is suspended by way of precaution and the establishment of a connection is thus interrupted in block 306. Even if the establishment of a connection is continued, the analysed communications remain temporarily stored on the first microcontroller 40 in accordance with embodiments until the establishment of a connection is concluded. For example, the analysed communication is a certificate of the reading device 20.

Once the establishment of a connection has been interrupted, the measurement data to which the analysed certificate makes reference are sensed, forwarded, processed and provided. The blocks 308 to 314 relating to the sensing, forwarding, processing and providing of the measurement data of the sensors 70, 72 are similar to the blocks 202 to 208 of the method according to FIG. 2. The communication interface 59 of the second microcontroller 50 is thus used to transmit the measurement data, whereas the transmission of communications in order to establish the encrypted end-to-end connection is suspended. Measurement data of the fingerprint sensor 70 and/or the PIN keypad 72 are sensed depending on the content of the reference.

Once the sensed measurement data have been forwarded by the first microcontroller 40 in block 310, the suspended establishment of a connection is continued in block 316. To this end it is necessary in accordance with embodiments to again forward the communications hitherto forwarded from the first microcontroller 40 and still stored thereon. In particular, the forwarding of the analysed certificate interrupted in block 306 is continued. Once the encrypted end-to-end connection has been established, encrypted APDUs are exchanged in block 318 between the reading device 20 and the second application 58. This for example comprises the receiving and transmitting of command and response APDUs, similarly to the blocks 214 and 216 in FIG. 2.

FIG. 4 shows a flow diagram for a third exemplary method for operating the ID token 10 according to the invention from FIG. 1.

In block 400 an encrypted end-to-end connection between the reading device 20 and a second application 58 is established. Encrypted APDUs are transmitted to the protected second microcontroller 50 via the contact-based microcontroller communication interface 59 thereof over a first logical channel. A first context of the protected second microcontroller 50 is assigned to the first logical channel. In block 402 an encrypted command APDU sent from the reading device 20 is received by the first microcontroller 40. The first microcontroller 40 does not have any access to the encrypted user data of the command APDU, however it does have access to the unencrypted header data thereof. These header data for example are analysed with a predefined search form. In block 404 a reference to measurement data of the sensors 70, 72 is detected, for example access to the corresponding measurement data. In block 406 the communication via the first logical channel is then paused. The analysed command APDU temporarily stored on the first microcontroller 40 is not forwarded for the time being.

The first microcontroller 40 switches over and establishes a connection between the fingerprint sensor 70 and/or the PIN keypad 72 on the one hand and the first application 56 of the protected second microcontroller 50 on the other hand by requesting measurement data and transmitting said data over a second logical channel to the protected second microcontroller 50. A second context of the protected second microcontroller 50 is assigned to the second logical channel. The protected second microcontroller 50 is configured to change between the various contexts depending on which logical channel is used for communication. In the case of the communication between the microcontrollers 40, 50, the first microcontroller 40 acts as master, and the protected second microcontroller 50 acts as a slave. The blocks 408 to 414 relating to the sensing, forwarding, processing and providing of the measurement data of the sensors 70, 72, are similar to the blocks 202 to 208 of the method according to FIG. 2.

Once the sensed measurement data have been forwarded by means of the second logical channel in block 410, the first microcontroller 40 in block 416 changes back to the paused first logical channel and continues the encrypted communication by forwarding the temporarily stored command APDU to the second application 58. The second application 58 responds to the command APDU for example with a response APDU similarly to block 216 in FIG. 2, which is received by the first microcontroller 40 and forwarded via the antenna 30 to the reading device 20.

| List of reference signs | |
| --- | --- |
| 10 | ID token |
| 20 | reading device |
| 22 | antenna |
| 24 | cryptographic circuit |
| 30 | antenna module |
| 40 | first microcontroller |
| 42 | first processor |
| 44 | first memory |
| 50 | second protected microcontroller |
| 52 | second processor |
| 54 | second memory |
| 56 | first application |
| 58 | second application |
| 59 | communication interface |
| 60 | holder |
| 70 | fingerprint sensor |
| 72 | PIN keypad |
| 80 | display |
| 82 | LEDs |
| 100 | system |

The invention claimed is:

1. An identification (ID) token comprising
   a sensor configured to sense measurement data,
   a communication interface,
   a first microcontroller, and
   a protected second microcontroller having at least one microcontroller communication interface, which is arranged in a holder of the ID token, wherein the microcontroller communication interface is configured to provide a data input and a data output;
   wherein the first microcontroller, for data exchange with the microcontroller communication interface of the protected second microcontroller, is connected to the sensor and to the communication interface of the ID token, and wherein the first microcontroller is configured to exchange data with a reading device via the communication interface of the ID token;
   wherein the protected second microcontroller comprises a first and a second application;
   wherein the first application is configured to compare the measurement data of the sensor with comparison data stored in a memory of the second microcontroller and forward the comparison result to the second application;
   wherein the second application is configured to establish a connection to the reading device in the form of an encrypted end-to-end connection and outputs specified data by a read command of the reading device via the encrypted end-to-end connection, wherein encrypted Application Protocol Data Units (APDUs) are transmitted via the encrypted end-to-end connection;
   wherein the first microcontroller is configured as a proxy for switching between (1) the sensing of the measurement data by the sensor and forwarding of the sensed measurement data from the sensor to the first application of the protected second microcontroller using the microcontroller communication interface of the second microcontroller and (2) forwarding of notifications for establishing a connection between the second application and the reading device or forwarding of APDUs using the communication interface of the ID token;
      wherein the protected second microcontroller is further configured to provide a plurality of logical channels for data exchange via the microcontroller communication interface, wherein the communication via the encrypted end-to-end connection is performed over a first logical channel of the second microcontroller, and wherein the first microcontroller is further configured to:
         receive and temporarily store an encrypted Application Protocol Data Unit (APDU), wherein the APDU is sent via the encrypted end-to-end connection from the reading device to the second application and contains unencrypted header data and encrypted user data, and analyze the header data;
         send to the sensor a request to sense the measurement data, in response to the header data comprising a reference to measurement data sensed by the sensor;
         receive, upon receipt of the request to sense the measurement data, the sensed measurement data from the sensor and forward the measurement data to the first application over a second logical channel of the second microcontroller, and
         forward the temporarily stored encrypted APDU to the second application over the first logical channel.

2. The ID token according to claim 1, wherein the at least one microcontroller communication interface of the protected second microcontroller is a contact-based communication interface.

3. The ID token according to claim 1, wherein the protected second microcontroller comprises a single microcontroller communication interface.

4. The ID token according to claim 1, wherein the first microcontroller is further configured to exchange data contactlessly with a reading device via the communication interface of the ID token.

5. The ID token according to claim 1, wherein the first microcontroller is further configured to exchange data in a contact-based manner with the reading device via the communication interface of the ID token.

6. The ID token according to claim 1, wherein the second application comprises the first application.

7. The ID token according to claim 1, wherein the measurement data comprises one or more of the following: biometric features, a PIN, acceleration data, GPS coordinates and temperature data, or any combinations thereof.

8. The ID token according to claim 1, wherein
   the ID token comprises a plurality of different sensors configured to sense a plurality of different items of measurement data, and
   the first microcontroller is connected to the plurality of different sensors for data exchange, wherein the first application is further configured to compare the measurement data of each sensor from the plurality of different sensors with comparison data stored in a memory of the second microcontroller and to forward comparison results generated from comparing the measurement data to the second application.

9. The ID token according to claim 1, wherein the first microcontroller is further configured as a master and the protected second microcontroller is further configured as a slave.

10. The ID token according to claim 1, wherein the second microcontroller is physically protected by one or more of the following elements: a clock frequency sensor, a temperature sensor, a voltage sensor, and a light sensor, or any combinations thereof.

11. The ID token according to claim 1, wherein the second microcontroller is cryptographically protected by one or more of the following elements: a random number generator, a generator for cryptographic keys, a hash generator, an encryption and decryption module, a signature module, one or more certificates and one or more non-migratable or cryptographic keys, or any combinations thereof.

12. The ID token according to claim 1, wherein the microcontroller communication interface of the protected second microcontroller is hard-wired to the first microcontroller.

13. The ID token according to claim 1, wherein the protected second microcontroller is further configured as an exchangeable module and the holder of the ID token is configured as a plug-in connection for the exchangeable module.

14. The ID token according to claim 1, wherein the ID token further includes an output device to which the first microcontroller is connected for data exchange.

15. A system which comprises:
an identification (ID) token; and
a reading device having a reading device communication interface configured for data exchange with a communication interface of the ID token;
wherein the ID token comprises:
  a sensor configured to sense measurement data,
  the communication interface,
  a first microcontroller, and
  a protected second microcontroller having at least one microcontroller communication interface, which is arranged in a holder of the ID token, wherein the microcontroller communication interface is configured to provide a data input and a data output;
    wherein the first microcontroller, for data exchange with the microcontroller communication interface of the protected second microcontroller, is connected to the sensor and to the communication interface of the ID token, and wherein the first microcontroller is configured to exchange data with a reading device via the communication interface of the ID token;
    wherein the protected second microcontroller comprises a first and a second application;
    wherein the first application is configured to compare the measurement data of the sensor with comparison data stored in a memory of the second microcontroller and forward the comparison result to the second application;
    wherein the second application is configured to establish a connection to the reading device in the form of an encrypted end-to-end connection and output specified data by a read command of the reading device via the encrypted end-to-end connection, wherein encrypted Application Protocol Data Units (APDUs) are transmitted via the encrypted end-to-end connection;
    wherein the first microcontroller is a proxy for switching between (1) the sensing of the measurement data by the sensor and forwarding of the sensed measurement data from the sensor to the first application of the protected second microcontroller using the microcontroller communication interface of the second microcontroller and (2) forwarding of notifications for establishing a connection between the second application and the reading device or forwarding of Application Protocol Data Units (APDUs) using the communication interface of the ID token;
    wherein the protected second microcontroller is further configured to provide a plurality of logical channels for data exchange via the microcontroller communication interface, wherein the communication via the encrypted end-to-end connection is performed over a first logical channel of the second microcontroller, and
    wherein the first microcontroller is further configured to:
      receive and temporarily store an encrypted Application Protocol Data Unit (APDU), wherein the APDU is sent via the encrypted end-to-end connection from the reading device to the second application and contains unencrypted header data and encrypted user data, and analyze the header data;
      send to the sensor a request to sense the measurement data, in response to the header data comprising a reference to measurement data sensed by the sensor;
      receive, upon receipt of the request to sense the measurement data, the sensed measurement data from the sensor and forward the measurement data to the first application over a second logical channel of the second microcontroller, and
      forward the temporarily stored encrypted APDU to the second application over the first logical channel.

16. An identification (ID) token comprising
a sensor configured to sense measurement data,
a communication interface,
a first microcontroller, and
a protected second microcontroller having at least one microcontroller communication interface, which is arranged in a holder of the ID token, wherein the microcontroller communication interface is configured to provide a data input and a data output;
  wherein the first microcontroller, for data exchange with the microcontroller communication interface of the protected second microcontroller, is connected to the sensor and to the communication interface of the ID token, and wherein the first microcontroller is configured to exchange data with a reading device via the communication interface of the ID token;
  wherein the protected second microcontroller comprises a first and a second application;
  wherein the first application is configured to compare the measurement data of the sensor with comparison data stored in a memory of the second microcontroller and forward the comparison result to the second application;
  wherein the second application is configured to establish a connection to the reading device and output specified data by a read command of the reading device;
  wherein the first microcontroller is configured as a proxy for switching between (1) the sensing of the measurement data by the sensor and forwarding of the sensed measurement data from the sensor to the first application of the protected second microcontroller using the microcontroller communication interface of the second microcontroller and (2) forwarding of notifications for establishing a connection between the second application and the reading device or forwarding of Application Protocol Data Units (APDUs) using the communication interface of the ID token;
  wherein the first microcontroller is further configured to:
    receive an unencrypted communication sent from the reading device to the second application during the course of establishing an encrypted end-to-end connection, wherein said unencrypted communication is temporarily stored and analyzed;
    in response to the unencrypted communication including a reference to measurement data sensed by the sensor, the first microcontroller is further configured to
      send a request to sense the measurement data to the sensor;

upon receipt of the request, receive the sensed measurement data from the sensor and forward the measurement data to the first application; and forward the temporarily stored unencrypted communication to the second application, wherein the unencrypted communication is a certificate which authorizes the reading device to check the measurement data sensed by the sensor using the first application.

17. The ID token according to claim 16, wherein the second application is configured to establish the connection to the reading device in the form of an encrypted end-to-end connection and output the specified data by the read command of the reading device via the encrypted end-to-end connection, wherein encrypted APDUs are transmitted via the encrypted end-to-end connection.

18. The ID token according to claim 16, wherein the first microcontroller is further configured to:

receive all communications sent from the reading device to the second application during the course of the establishment of the encrypted end-to-end connection, and temporarily store and forward the communications, wherein, once the measurement data has been forwarded, all temporarily stored communications are forwarded again to the second application.

19. A system which comprises:

an identification (ID) token; and a reading device having a reading device communication interface configured for data exchange with a communication interface of the ID token;

wherein the ID token comprises:

a sensor configured to sense measurement data, the communication interface, a first microcontroller, and a protected second microcontroller having at least one microcontroller communication interface, which is arranged in a holder of the ID token, wherein the microcontroller communication interface is configured to provide a data input and a data output;

wherein the first microcontroller, for data exchange with the microcontroller communication interface of the protected second microcontroller, is connected to the sensor and to the communication interface of the ID token, and wherein the first microcontroller is configured to exchange data with a reading device via the communication interface of the ID token;

wherein the protected second microcontroller comprises a first and a second application;

wherein the first application is configured to compare the measurement data of the sensor with comparison data stored in a memory of the second microcontroller and forwards the comparison result to the second application;

wherein the second application is configured to establish a connection to the reading device and outputs wherein the second application is configured to establish a connection to the reading device and output specified data by a read command of the reading device;

wherein the first microcontroller is configured as a proxy for switching between (1) the sensing of the measurement data by the sensor and forwarding of the sensed measurement data from the sensor to the first application of the protected second microcontroller using the microcontroller communication interface of the second microcontroller and (2) forwarding of notifications for establishing a connection between the second application and the reading device or forwarding of Application Protocol Data Units (APDUs) using the communication interface of the ID token;

wherein the first microcontroller is further configured to:

receive an unencrypted communication sent from the reading device to the second application during the course of establishing an encrypted end-to-end connection, wherein said unencrypted communication is temporarily stored and analyzed;

in response to the unencrypted communication including a reference to measurement data sensed by the sensor, the first microcontroller is further configured to send a request to sense the measurement data to the sensor;

upon receipt of the request, receive the sensed measurement data from the sensor and forward the measurement data to the first application; and forward the temporarily stored unencrypted communication to the second application, wherein the unencrypted communication is a certificate which authorizes the reading device to check the measurement data sensed by the sensor using the first application.

20. The system according to claim 19, wherein the second application is configured to establish the connection to the reading device in the form of an encrypted end-to-end connection and output the specified data by the read command of the reading device via the encrypted end-to-end connection, wherein encrypted APDUs are transmitted via the encrypted end-to-end connection.

* * * * *